US008680198B2

(12) United States Patent
Malotky et al.

(10) Patent No.: US 8,680,198 B2
(45) Date of Patent: *Mar. 25, 2014

(54) COMPOSITE DISPERSION, METHOD OF PRODUCING THE SAME, AND ARTICLES MADE THEREFROM

(71) Applicant: Dow Global Technologies LLC, Midland, MI (US)

(72) Inventors: David L. Malotky, Midland, MI (US); Sarah T. Eckersley, Midland, MI (US); Bedri Erdem, Midland, MI (US); Debkumar Bhattacharjee, Blue Bell, PA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,437

(22) Filed: Dec. 4, 2012

(65) Prior Publication Data

US 2013/0116361 A1 May 9, 2013

Related U.S. Application Data

(63) Continuation of application No. 12/994,999, filed as application No. PCT/US2009/045279 on May 27, 2009, now Pat. No. 8,349,945.

(60) Provisional application No. 61/058,551, filed on Jun. 3, 2008.

(51) Int. Cl.
*C08L 83/07* (2006.01)
*C08L 67/00* (2006.01)
*C08L 71/02* (2006.01)

(52) U.S. Cl.
USPC ............ 524/588; 524/601; 524/599; 524/612

(58) Field of Classification Search
None
See application file for complete search history.

(56) References Cited

U.S. PATENT DOCUMENTS

| | | | |
|---|---|---|---|
| 3,645,992 A | 2/1972 | Elston | |
| 3,686,359 A | 8/1972 | Soldatos et al. | |
| 3,876,578 A * | 4/1975 | Takada et al. | 524/501 |
| 4,066,628 A | 1/1978 | Ashida et al. | |
| 4,076,698 A | 2/1978 | Anderson et al. | |

(Continued)

FOREIGN PATENT DOCUMENTS

| | | | | |
|---|---|---|---|---|
| JP | 2003183563 A | * | 7/2003 | C09D 123/00 |
| WO | 9719120 | | 5/1997 | |

(Continued)

OTHER PUBLICATIONS

Derwent abstract for JP-2003183563, 2003, 4 pages.*

(Continued)

*Primary Examiner* — Robert S Loewe

(57) ABSTRACT

The instant invention is a composite dispersion, method of producing the same, and articles made therefrom. The composite dispersion according to the instant invention comprises (1) a first seed dispersion comprising (a) a first internal phase; and (b) an external phase, and (2) a second internal phase; wherein the composite dispersion comprises more than 60 percent by the combined weight of the first internal phase and the second internal phase, and the composite dispersion has a viscosity of less than 10,000 cP measured by RV4 spindle at 20 rpm at greater than 60 weight percent total internal phase, and wherein the composite dispersion has a bimodal particle size distribution and a particle size ratio (P2/P1) in the range of 2 to 200.

8 Claims, 2 Drawing Sheets

(56) References Cited

U.S. PATENT DOCUMENTS

| | | | | |
|---|---|---|---|---|
| 4,232,135 A * | 11/1980 | Bentley et al. | | 525/509 |
| 4,294,735 A * | 10/1981 | Bentley et al. | | 524/504 |
| 4,384,056 A * | 5/1983 | Schmidt et al. | | 523/221 |
| 4,395,500 A * | 7/1983 | Lohr et al. | | 523/221 |
| 4,438,254 A | 3/1984 | Doorakian et al. | | |
| 4,442,247 A * | 4/1984 | Ishikura et al. | | 523/414 |
| 4,474,860 A * | 10/1984 | Van Gilder et al. | | 428/511 |
| 4,480,082 A | 10/1984 | McLean et al. | | |
| 4,504,609 A * | 3/1985 | Kuwajima et al. | | 523/501 |
| 4,534,907 A | 8/1985 | Peerman et al. | | |
| 4,567,099 A * | 1/1986 | Van Gilder et al. | | 428/327 |
| 4,599,392 A | 7/1986 | McKinney et al. | | |
| 4,624,973 A * | 11/1986 | Kuwajima et al. | | 523/221 |
| 4,640,801 A | 2/1987 | Simone et al. | | |
| 4,988,781 A | 1/1991 | McKinney et al. | | |
| 4,997,864 A * | 3/1991 | Waters | | 523/319 |
| 5,089,588 A | 2/1992 | White et al. | | |
| 5,115,075 A | 5/1992 | Brennan et al. | | |
| 5,171,820 A | 12/1992 | Mang et al. | | |
| 5,210,113 A * | 5/1993 | Waters | | 523/205 |
| 5,246,751 A | 9/1993 | White et al. | | |
| 5,258,424 A * | 11/1993 | Yagi et al. | | 523/221 |
| 5,272,236 A | 12/1993 | Lai et al. | | |
| 5,278,272 A | 1/1994 | Lai et al. | | |
| 5,344,675 A * | 9/1994 | Snyder | | 427/388.4 |
| 5,466,772 A | 11/1995 | Angelmayer et al. | | |
| 5,504,172 A | 4/1996 | Imuta et al. | | |
| 5,677,383 A | 10/1997 | Chum et al. | | |
| 5,726,259 A * | 3/1998 | Hayes et al. | | 526/80 |
| 5,844,045 A | 12/1998 | Kolthammer et al. | | |
| 5,869,575 A | 2/1999 | Kolthammer et al. | | |
| 5,938,437 A | 8/1999 | DeVincenzo | | |
| 6,107,433 A | 8/2000 | Petrovic et al. | | |
| 6,111,023 A | 8/2000 | Chum et al. | | |
| 6,121,398 A | 9/2000 | Wool et al. | | |
| 6,277,953 B1 | 8/2001 | Nothnagel et al. | | |
| 6,316,549 B1 | 11/2001 | Chum et al. | | |
| 6,448,341 B1 | 9/2002 | Kolthammer et al. | | |
| 6,538,070 B1 | 3/2003 | Cardwell et al. | | |
| 6,566,446 B1 | 5/2003 | Parikh et al. | | |
| 6,673,451 B2 * | 1/2004 | Bardman et al. | | 428/402.22 |
| 6,683,132 B1 | 1/2004 | Schick et al. | | |
| 6,891,053 B2 | 5/2005 | Chasar et al. | | |
| 6,897,283 B2 | 5/2005 | Gerber et al. | | |
| 6,962,636 B2 | 11/2005 | Kurth et al. | | |
| 6,979,477 B2 | 12/2005 | Kurth et al. | | |
| 7,608,668 B2 | 10/2009 | Li Pi Shan et al. | | |
| 2002/0147270 A1 | 10/2002 | Kuo et al. | | |
| 2004/0147638 A1 | 7/2004 | Kim et al. | | |
| 2005/0004272 A1 | 1/2005 | Kuo et al. | | |
| 2005/0014883 A1* | 1/2005 | Blankenship et al. | | 524/458 |
| 2006/0128885 A1* | 6/2006 | Rische et al. | | 524/589 |
| 2006/0149000 A1* | 7/2006 | Ikuta et al. | | 525/343 |
| 2008/0038977 A1 | 2/2008 | Lebduska et al. | | |
| 2010/0015341 A1* | 1/2010 | Erdem et al. | | 427/385.5 |
| 2010/0113646 A1* | 5/2010 | Bardman et al. | | 523/201 |
| 2010/0230062 A1* | 9/2010 | Attal | | 162/168.1 |

FOREIGN PATENT DOCUMENTS

| | | |
|---|---|---|
| WO | 00/01745 | 1/2000 |
| WO | 2004020497 | 3/2004 |
| WO | 2004058882 | 7/2004 |
| WO | 2004096744 | 11/2004 |
| WO | 2004096882 | 11/2004 |
| WO | 2004096883 | 11/2004 |
| WO | 2005090427 | 9/2005 |
| WO | 2007003513 | 1/2007 |
| WO | 2008057878 | 5/2008 |
| WO | WO 2008/077118 | * 6/2008 |

OTHER PUBLICATIONS

Machine translation for JP-2003183563, 20 pages, translation generated Apr. 2012.*

PCT/US2009/045279 International Preliminary Report on Patentability dated Dec. 6, 2010, 8 pages.

PCT/US2009/045279 International Search Report dated Aug. 4, 2009, 3 pages.

JPS5599976, English Abstract, published Jul. 30, 1980, Kansai Paint Co LTD, Applicant, 1 page.

Counterpart EP09759063.2 Office Action dated May 16, 2011, 3 pages.

Response to counterpart EP09759063.2 Office Action dated May 16, 2011 filed Sep. 9, 2011, 5 pages.

Counterpart EP09759063.2 Office Action dated Oct. 12, 2011, 6 pages.

Response to counterpart EP09759063.2 Office Action dated Oct. 12, 2011 filed Jan. 19, 2012, 9 pages.

Counterpart EP09759063.2 Office Action dated Mar. 14, 2012, 10 pages.

Response to counterpart EP09759063.2 Office Action dated Mar. 14, 2012 filed Jul. 13, 2012, 6 pages.

Counterpart EP09759063.2 Office Action dated Jul. 25, 2012, 7 pages.

Response to counterpart EP09759063.2 Office Action dated Jul. 25, 2012 filed Dec. 14, 2012, 9 pages.

Counterpart EP09759063.2 Office Action dated Jan. 15, 2013, 5 pages.

"Polyester", Encyclopedia Britannica. Encyclopedia Britannica Online, Encyclopedia Britannica Inc., 2012. Web. Aug. 10, 2012 <http://www.britannica.com/EBchecked/topic/468484/polyester>, 1 page.

"Polyurethane", Encyclopedia Britannica. Encyclopedia Britannica Online, Encyclopedia Britannica Inc., 2012. Web. Aug. 10, 2012 <http://www.britannica.com/EBchecked/topic/469218/polyurethane>, 2 pages.

"Silicone", Encyclopedia Britannica. Encyclopedia Britannica Online, Encyclopedia Britannica Inc., 2012. Web. Aug. 10, 2012 <http://www.britannica.com/EBchecked/topic/544410/silicone>, 2 pages.

"Epoxy", Encyclopedia Britannica. Encyclopedia Britannica Online, Encyclopedia Britannica Inc., 2012. Web. Aug. 10, 2012 <http://www.britannica.com/EBchecked/topic/1372259/epoxy>, 1 page.

"Polyolefin", Encyclopedia Britannica. Encyclopedia Britannica Online, Encyclopedia Britannica Inc., 2012. Web. Aug. 10, 2012 <http://www.britannica.com/EBchecked/topic/468927/polyolefin>, 1 page.

"Alkyd resin", Encyclopedia Britannica. Encyclopedia Britannica Online, Encyclopedia Britannica Inc., 2012. Web. Aug. 10, 2012 <http://www.britannica.com/EBchecked/topic/15764/alkyd resin>, 2 pages.

"What Are Emulsion Polymers (EPs)?", Emulsion Polymers Council, Inc., Dec. 14, 2012, 1 page.

Counterpart Japanese Patent Application No. 2011-512530 Office Action dated Jan. 29, 2013, 5 pages.

Counterpart Chinese Patent Application No. 200980130032.0, First Office Action dated Apr. 20, 2012, 5 pages.

Counterpart Chinese Patent Application No. 200980130032.0, Second Office Action dated Dec. 7, 2012, 3 pages.

Counterpart Chinese Patent Application No. 200980130032.0, Response to Second Office Action dated Dec. 7, 2012, 2 pages.

Counterpart Chinese Patent Application No. 200980130032.0, Third Office Action dated Apr. 3, 2013, 4 pages.

Chinese Instructions to Office Action dated Jun. 13, 2013; from CN counterpart Application No.

Chinese Response to Office Action dated Jun. 18, 2013; from CN counterpart Application No.

JP Response to Office Action dated May 29, 2013; from JP counterpart Application No. 2011-512530.

EP Response to Office Action dated May 7, 2013; from EP counterpart Application No. 09 759 063.2.

EP Office Action dated May 27, 2013; from EP counterpart Application No. 09 759 063.2.

(56) References Cited

OTHER PUBLICATIONS

Chinese Office Action dated Aug. 13, 2013; from Chinese counterpart Application No. 200980130032.0.

Instructions to Chinese Office Action dated Oct. 16, 2013; from Chinese counterpart Application No. 200980130032.0.
Chinese Response to Fourth Office Action dated Oct. 25, 2013; from Chinese counterpart Application No. 200980130032.0.

* cited by examiner

US 8,680,198 B2

COMPOSITE DISPERSION, METHOD OF PRODUCING THE SAME, AND ARTICLES MADE THEREFROM

CROSS-REFERENCE TO RELATED APPLICATIONS

This application is a continuation application of the U.S. Non Provisional patent application Ser. No. 12/994,999, filed on Nov. 29, 2010, entitled, "COMPOSITE DISPERSION, METHOD OF PRODUCING THE SAME, AND ARTICLES MADE THEREFROM," which is a 371 National Phase Application of International Patent Application No. PCT/US2009/045279, filed on May 27, 2009, an application claiming priority from the U.S. Provisional Patent Application No. 61/058,551, filed on Jun. 3, 2008, the teachings of which are incorporated by reference herein, as if reproduced in full hereinbelow.

FIELD OF INVENTION

The instant invention relates to a composite dispersion, method of producing the same, and articles made therefrom.

BACKGROUND OF THE INVENTION

The use of polymeric dispersions and blends of one or more such polymeric dispersions in different end-use applications is generally known. However, the existing polymeric dispersions and blends thereof possess certain deficiencies. In general, preparation of aqueous blend systems requires that each blend component be prepared as an aqueous solution, emulsion or dispersion individually, and then the components are mixed together to yield a formulated product. Such requirement limits the levels of ingredient incorporation into the formulation. As a result, water is introduced with each component, and if each individual component contains a very low solid content, this may yield low solid formulated product. Additionally, if high levels of surfactant are required to prepare the individual components, this high level of surfactant may then become incorporated into the formulated product. It is, however, desirable to produce a formulated product while maintaining a high solid content and low surfactant content in the formulated product.

Despite the research efforts in developing polymeric dispersion blends, there is still a need for a composite dispersion having high solid content and improved processability properties such as low viscosity. Furthermore, there is still a need for a method of producing a composite dispersion having high solid content and improved processability properties such as low viscosity.

SUMMARY OF THE INVENTION

The instant invention is a composite dispersion, method of producing the same, and articles made therefrom. The composite dispersion according to the instant invention comprises (1) a first seed dispersion comprising (a) a first internal phase; and (b) an external phase, and (2) a second internal phase; wherein the composite dispersion comprises more than 60 percent by the combined weight of the first internal phase and the second internal phase, and the composite dispersion has a viscosity of less than 10,000 cP measured by RV4 spindle at 20 rpm at greater than 60 weight percent total internal phase, and wherein the composite dispersion has a bimodal particle size distribution and a particle size ratio (P2/P1) in the range of 2 to 200. The first internal phase comprises a first hydrophobic material selected from the group consisting of alkyd, silicone, polyolefin, polyurethane, epoxy, emulsion polymer, and polyester. The external phase comprises water. The second internal phase comprises a second hydrophobic material selected from the group consisting of alkyd, silicone, polyurethane prepolymer, epoxy, and polyester. The process for producing a composite dispersion according to the instant invention comprises the steps of: (1) selecting a first internal phase comprising a first hydrophobic material selected from the group consisting of alkyd, silicone, polyolefin, polyurethane, epoxy, emulsion polymer, polyester; (2) selecting an external phase comprising water; (3) contacting the first hydrophobic material with the external phase; (4) thereby producing a first seed dispersion; (5) contacting the first seed dispersion and a second internal phase comprising a second hydrophobic material selected from the group consisting of alkyd, silicone, polyurethane prepolymer, epoxy, polyester; (6) thereby forming the composite dispersion, wherein the composite dispersion comprises more than 60 percent by the combined weight of the first internal phase and the second internal phase, and wherein the composite dispersion has a viscosity of less than 10,000 cP measured by RV4 spindle at 20 rpm at greater than 60 weight percent total internal phase, and wherein the composite dispersion has a bimodal particle size distribution and a particle size ratio (P2/P1) in the range of 2 to 200. The articles according to the instant invention comprise the inventive composite dispersion.

In one embodiment, the instant invention provides a composite dispersion comprising (1) a first seed dispersion comprising (a) a first internal phase comprising a first hydrophobic material selected from the group consisting of alkyd, silicone, polyolefin, polyurethane, epoxy, emulsion polymer, and polyester; and (b) an external phase comprising water, and (2) a second internal phase comprising a second hydrophobic material selected from the group consisting of alkyd, silicone, polyurethane prepolymer, epoxy, and polyester; wherein the composite dispersion comprises more than 60 percent by the combined weight of the first internal phase and the second internal phase, and the composite dispersion has a viscosity of less than 10,000 cP measured by RV4 spindle at 20 rpm at greater than 60 weight percent total internal phase, and wherein the composite dispersion has a bimodal particle size distribution and a particle size ratio (P2/P1) in the range of 2 to 200.

In an alternative embodiment, the instant invention provides a composite dispersion comprising (1) a first seed dispersion comprising (a) a first internal phase comprising a first hydrophobic material selected from the group consisting of alkyd, silicone, polyolefin, polyurethane, epoxy, emulsion polymer, and polyester; and (b) an external phase comprising water, and (2) a second internal phase comprising a second hydrophobic material selected from the group consisting of alkyd, silicone, polyurethane prepolymer, epoxy, and polyester; wherein the composite dispersion comprises more than 60 percent by the combined weight of the first internal phase and the second internal phase, and the composite dispersion has a viscosity of less than 10,000 cP measured by RV4 spindle at 20 rpm at greater than 60 weight percent total internal phase, and wherein the composite dispersion has a bimodal particle size distribution and a particle size ratio (P2/P1) in the range of 2 to 200; provided however that if the first internal phase is a alkyd, then the second internal phase is not polyurethane prepolymer.

In an alternative embodiment, the instant invention provides a composite dispersion comprising (1) a first seed dispersion comprising (a) a first internal phase comprising a first hydrophobic material selected from the group consisting of alkyd, silicone, polyolefin, polyurethane, epoxy, emulsion polymer, and polyester; and (b) an external phase comprising water, and (2) a second internal phase comprising a second hydrophobic material selected from the group consisting of alkyd, silicone, polyurethane prepolymer, epoxy, and polyester; wherein the composite dispersion comprises more than 60 percent by the combined weight of the first internal phase and the second internal phase, and the composite dispersion has a viscosity of less than 10,000 cP measured by RV4 spindle at 20 rpm at greater than 60 weight percent total internal phase, and wherein the composite dispersion has a bimodal particle size distribution and a particle size ratio (P2/P1) in the range of 2 to 200; provided however that if the first internal phase is a polyurethane, then the second internal phase is not an alkyd.

In an alternative embodiment, the instant invention further provides a process for producing a composite dispersion comprising the steps of: (1) selecting a first internal phase comprising a first hydrophobic material selected from the group consisting of alkyd, silicone, polyolefin, polyurethane, epoxy, emulsion polymer, polyester; (2) selecting an external phase comprising water; (3) contacting the first hydrophobic material with the external phase; (4) thereby producing a first seed dispersion; (5) contacting the first seed dispersion and a second internal phase comprising a second hydrophobic material selected from the group consisting of alkyd, silicone, polyurethane prepolymer, epoxy, polyester; (6) thereby forming the composite dispersion, wherein the composite dispersion comprises more than 60 percent by the combined weight of the first internal phase and the second internal phase, and wherein the composite dispersion has a viscosity of less than 10,000 cP measured by RV4 spindle at 20 rpm at greater than 60 weight percent total internal phase, and wherein the composite dispersion has a bimodal particle size distribution and a particle size ratio (P2/P1) in the range of 2 to 200.

In another alternative embodiment, the instant invention further provides an article comprising a composite dispersion comprising (1) a first seed dispersion comprising (a) a first internal phase comprising a first hydrophobic material selected from the group consisting of alkyd, silicone, polyolefin, polyurethane, epoxy, emulsion polymer, and polyester; and (b) an external phase comprising water, and (2) a second internal phase comprising a second hydrophobic material selected from the group consisting of alkyd, silicone, polyurethane prepolymer, epoxy, and polyester; wherein the composite dispersion comprises more than 60 percent by the combined weight of the first internal phase and the second internal phase, and the composite dispersion has a viscosity of less than 10,000 cP measured by RV4 spindle at 20 rpm at greater than 60 weight percent total internal phase, and wherein the composite dispersion has a bimodal particle size distribution and a particle size ratio (P2/P1) in the range of 2 to 200.

In an alternative embodiment, the instant invention provides a composition, method of producing the same, and articles made therefrom in accordance with any of the preceding embodiments, except that the alkyd comprises the reaction product of one or more polyhydroxyl alcohol and one or more polycarboxylic acids in the presence of one or more drying oils.

In an alternative embodiment, the instant invention provides a composition, method of producing the same, and articles made therefrom in accordance with any of the preceding embodiments, except that the polyhydroxyl alcohol is glycol selected from the group consisting of ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, glycerol, trimellitic anhydride, pyromellitic dianhydride, dimethylolpropionic acid, and the like.

In an alternative embodiment, the instant invention provides a composition, method of producing the same, and articles made therefrom in accordance with any of the preceding embodiments, except that the polycarboxylic acid is selected from the group consisting of phthalic acid, maleic acid, fumaric acid, isophthalic acid, succinic acid, adipic acid, azeleic acid, sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, anhydrides thereof, and esters thereof.

In an alternative embodiment, the instant invention provides a composition, method of producing the same, and articles made therefrom in accordance with any of the preceding embodiments, except that the one or more drying oils are selected from the group consisting of coconut oil, fish oil, linseed oil, tung oil, castor oil, cottonseed oil, safflower oil, sunflower oil, soybean oil, and tall oil.

In an alternative embodiment, the instant invention provides a composition, method of producing the same, and articles made therefrom in accordance with any of the preceding embodiments, except that the silicone is polysiloxane polymer.

In an alternative embodiment, the instant invention provides a composition, method of producing the same, and articles made therefrom in accordance with any of the preceding embodiments, except that the polysiloxane polymer has a backbone comprising one or more [—Si(R)$_2$—O—] repeat units where the R group is an organic moiety selected from the group consisting of methyl, phenyl, polyether, and alkyl.

In an alternative embodiment, the instant invention provides a composition, method of producing the same, and articles made therefrom in accordance with any of the preceding embodiments, except that the polysiloxane polymer is linear, branched, or crosslinked.

In an alternative embodiment, the instant invention provides a composition, method of producing the same, and articles made therefrom in accordance with any of the preceding embodiments, except that the polyolefin is selected from the group consisting of ethylene based polymer, propylene based polymer, homopolymers thereof, copolymers thereof, combinations thereof, and blends thereof.

In an alternative embodiment, the instant invention provides a composition, method of producing the same, and articles made therefrom in accordance with any of the preceding embodiments, except that the composition is a reactive coating, peelable coating, release coating, anti-fouling coating, fabric coating, paper coating, metal coating, wood coating, barrier coating, fast drying coating, concrete coating, plastic coating, adhesive, sealant, viscosity modification agent, binder, lubricant, and the like.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
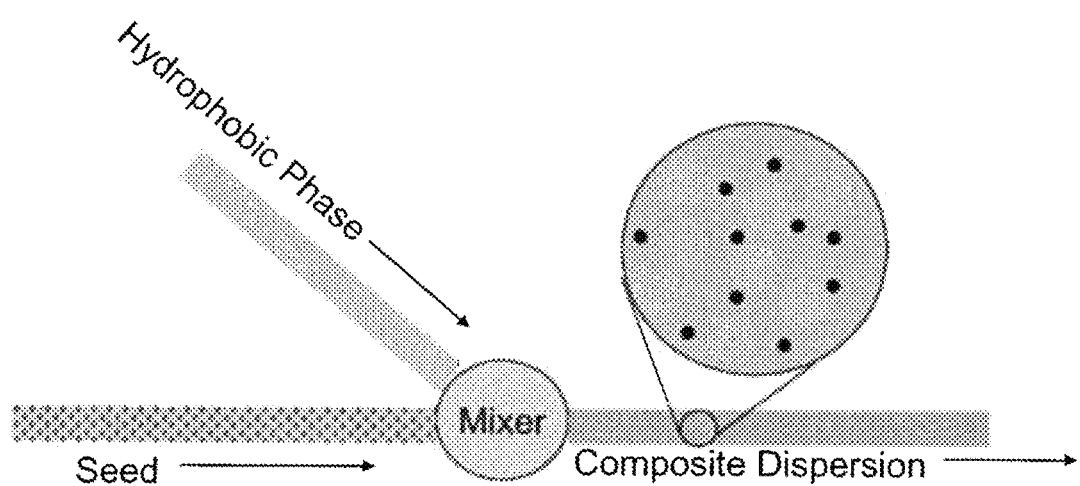
FIG. 1 is a schematic showing the process for producing the inventive composite dispersion.
Figure 2:
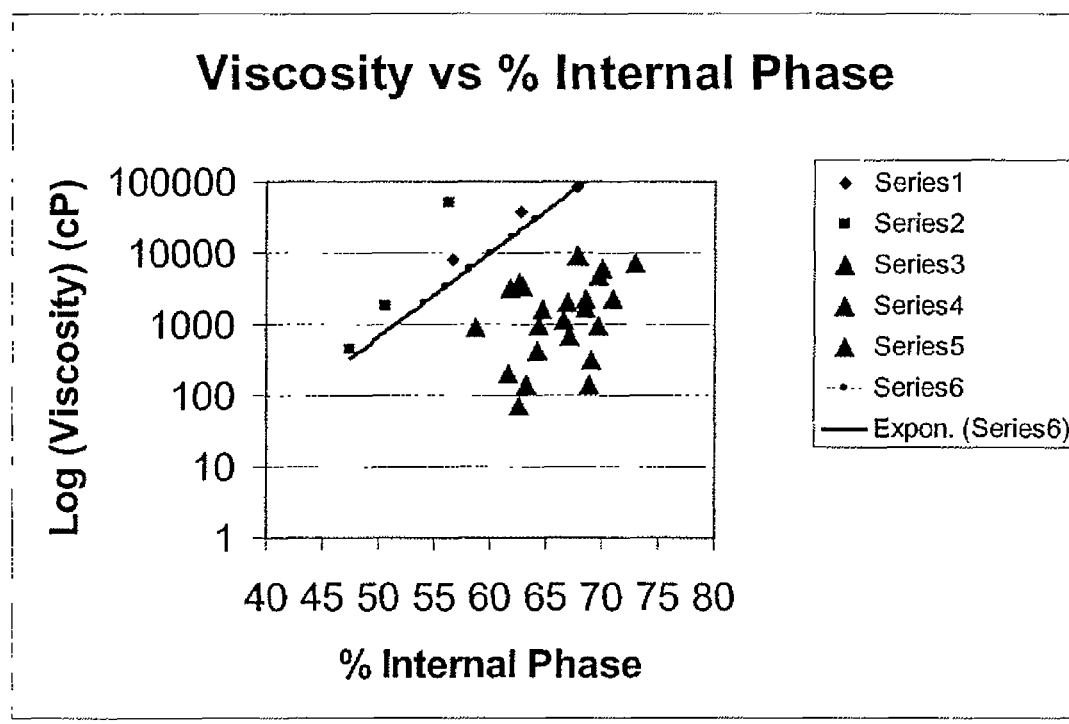
FIG. 2 is a graph illustrating the relationship between the viscosity and the weight percent of the total hydrophobic phase in the composite dispersion, and the inventive composite dispersion has a Log(viscosity) of equal or less than (0.118*(weight percent of the total hydrophobic phase))−3.08.

The instant invention is a composite dispersion, method of producing the same, and articles made therefrom. The composite dispersion according to the instant invention comprises (1) a first seed dispersion comprising (a) a first internal phase; and (b) an external phase, and (2) a second internal phase.

The seed dispersion may have a viscosity in the range of less than 1000 cP measured by RV4 spindle at 20 rpm at greater than 60 weight percent first internal phase. In the alternative, seed dispersion may have a viscosity in the range of less than 700 cP measured by RV4 spindle at 20 rpm at greater than 60 weight percent first internal phase. In the alternative, seed dispersion may have a viscosity in the range of less than 500 cP measured by RV4 spindle at 20 rpm at greater than 60 weight percent first internal phase. In the alternative, seed dispersion may have a viscosity in the range of less than 400 cP measured by RV4 spindle at 20 rpm at greater than 60 weight percent first internal phase. In the alternative, seed dispersion may have a viscosity in the range of less than 100 cP measured by RV4 spindle at 20 rpm at greater than 60 weight percent first internal phase. The seed dispersion may comprise 10 to 65 percent by weight of the first internal phase based on the total weight of the seed dispersion. In the alternative, the seed dispersion may comprise 20 to 50 percent by weight of the first internal phase based on the total weight of the seed dispersion. In the alternative, the seed dispersion may comprise 20 to 45 percent by weight of the first internal phase based on the total weight of the seed dispersion. In the alternative, the seed dispersion may comprise 30 to 50 percent by weight of the first internal phase based on the total weight of the seed dispersion. In the alternative, the seed dispersion may comprise 30 to 45 percent by weight of the first internal phase based on the total weight of the seed dispersion. The seed dispersion may have a polydispersity in the range of less than 10. In the alternative, the seed dispersion may have a polydispersity in the range of less than 5. In the alternative, the seed dispersion may have a polydispersity in the range of less than 2. In the alternative, the seed dispersion may have a polydispersity in the range of less than 1.5.

The first internal phase comprises one or more hydrophobic materials, optionally one or more surfactants, optionally one or more chain extenders; and optionally one or more solvents. The first internal phase may have $V_{Mean}$ (the average particle size measured by volume) in the range of less than 3 μm. In the alternative, the first internal phase may have $V_{Mean}$ (the average particle size measured by volume) in the range of less than 2 μm. In the alternative, the first internal phase may have $V_{Mean}$ (the average particle size measured by volume) in the range of less than 1 μm. In the alternative, the first internal phase may have $V_{Mean}$ (the average particle size measured by volume) in the range of less than 0.5 μm. The first internal phase may comprise at least 50 percent or more by weight of the one or more hydrophobic materials, based on total weight of the first internal phase. In the alternative, the first internal phase may comprise at least 60 percent or more by weight of the one or more hydrophobic materials, based on total weight of the first internal phase. In the alternative, the first internal phase may comprise at least 70 percent or more by weight of the one or more hydrophobic materials, based on total weight of the first internal phase. In the alternative, the first internal phase may comprise at least 80 percent or more by weight of the one or more hydrophobic materials, based on total weight of the first internal phase. In the alternative, the first internal phase may comprise at least 85 percent or more by weight of the one or more hydrophobic materials, based on total weight of the first internal phase. In the alternative, the first internal phase may comprise at least 90 percent or more by weight of the one or more hydrophobic materials, based on total weight of the first internal phase. In the alternative, the first internal phase may comprise at least 95 percent or more by weight of the one or more hydrophobic materials, based on total weight of the first internal phase. The first internal phase may comprise less than 20 percent by weight of one or more surfactants, based on the total weight of first internal phase. In the alternative, the first internal phase may comprise less than 15 percent by weight of one or more surfactants, based on the total weight of first internal phase. In the alternative, the first internal phase may comprise less than 10 percent by weight of one or more surfactants, based on the total weight of first internal phase. In the alternative, the first internal phase may comprise less than 5 percent by weight of one or more surfactants, based on the total weight of first internal phase. The first internal phase may comprise less than 50 percent by weight of one or more solvents, based on the total weight of first internal phase. In the alternative, the first internal phase may comprise less than 40 percent by weight of one or more solvents, based on the total weight of first internal phase. In the alternative, the first internal phase may comprise less than 30 percent by weight of one or more solvents, based on the total weight of first internal phase. In the alternative, the first internal phase may comprise less than 20 percent by weight of one or more solvents, based on the total weight of first internal phase. In the alternative, the first internal phase may comprise less than 10 percent by weight of one or more solvents, based on the total weight of first internal phase. In the alternative, the first internal phase may comprise less than 5 percent by weight of one or more solvents, based on the total weight of first internal phase. In the alternative, the first internal phase may comprise less than 2 percent by weight of one or more solvents, based on the total weight of first internal phase. In the alternative, the first internal phase may be free of any solvents.

The second internal phase comprises one or more hydrophobic materials, optionally one or more surfactants, optionally one or more chain extenders; and optionally one or more solvents. The second internal phase may have $V_{Mean}$ (the average particle size measured by volume) in the range of less than 50 μm. In the alternative, the second internal phase may have $V_{Mean}$ (the average particle size measured by volume) in the range of less than 40 μm. In the alternative, the second internal phase may have $V_{Mean}$ (the average particle size measured by volume) in the range of less than 30 μm. In the alternative, the second internal phase may have $V_{Mean}$ (the average particle size measured by volume) in the range of less than 20 µm. In the alternative, the second internal phase may have $V_{Mean}$ (the average particle size measured by volume) in the range of less than 10 µm. In the alternative, the second internal phase may have $V_{Mean}$ (the average particle size measured by volume) in the range of less than 5 µm. In the alternative, the second internal phase may have $V_{Mean}$ (the average particle size measured by volume) in the range of less than 2 µm. In the alternative, the second internal phase may have $V_{Mean}$ (the average particle size measured by volume) in the range of less than 1 µm. The second internal phase may comprise at least 50 percent or more by weight of the one or more hydrophobic materials, based on total weight of the second internal phase. The second internal phase may comprise at least 70 percent or more by weight of the one or more hydrophobic materials, based on total weight of the second internal phase. The second internal phase may comprise at least 80 percent or more by weight of the one or more hydrophobic materials, based on total weight of the second internal phase. In the alternative, the second internal phase may comprise at least 85 percent or more by weight of the one or more hydrophobic materials, based on total weight of the second internal phase. In the alternative, the second internal phase may comprise at least 90 percent or more by weight of the one or more hydrophobic materials, based on total weight of the second internal phase. In the alternative, the second internal phase may comprise at least 95 percent or more by weight of the one or more hydrophobic materials, based on total weight of the second internal phase. The second internal phase may comprise less than 20 percent by weight of one or more surfactants, based on the total weight of second internal phase. In the alternative, the second internal phase may comprise less than 15 percent by weight of one or more surfactants, based on the total weight of second internal phase. In the alternative, the second internal phase may comprise less than 10 percent by weight of one or more surfactants, based on the total weight of second internal phase. In the alternative, the second internal phase may comprise less than 5 percent by weight of one or more surfactants, based on the total weight of second internal phase. The second internal phase may comprise less than 50 percent by weight of one or more solvents, based on the total weight of second internal phase. In the alternative, the second internal phase may comprise less than 40 percent by weight of one or more solvents, based on the total weight of second internal phase. In the alternative, the second internal phase may comprise less than 30 percent by weight of one or more solvents, based on the total weight of second internal phase. In the alternative, the second internal phase may comprise less than 20 percent by weight of one or more solvents, based on the total weight of second internal phase. In the alternative, the second internal phase may comprise less than 10 percent by weight of one or more solvents, based on the total weight of second internal phase. In the alternative, the second internal phase may comprise less than 5 percent by weight of one or more solvents, based on the total weight of second internal phase. In the alternative, the second internal phase may comprise less than 2 percent by weight of one or more solvents, based on the total weight of second internal phase. In the alternative, the second internal phase may be free of any solvents.

The first hydrophobic material may be selected from the group consisting of alkyd, silicone, polyolefin, polyurethane, epoxy, emulsion polymer, and polyester, as described hereinbelow in further details.

The second hydrophobic material may be selected from the group consisting of alkyd, silicone, polyurethane prepolymer, epoxy, emulsion polymer, and polyester, as described hereinbelow in further details.

Alkyd resins are polyesters of polyhydroxyl alcohols and polycarboxylic acids chemically combined with various drying and semi-drying oils in different proportions. Polyhydroxyl alcohols may include, but are not limited to, such components as ethylene glycol, diethylene glycol, neopentyl glycol, 1,4-butanediol, 1,6-hexanediol, glycerol, pentaerythritol, sorbitol and mannitol.

Suitable glycols include, but are not limited to, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, trimellitic anhydride, pyromellitic dianhydride, dimethylolpropionic acid, and the like.

Polycarboxylic acids may include, but are not limited to, phthalic acid, maleic acid, fumaric acid, isophthalic acid, succinic acid, adipic acid, azeleic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, as well as from anhydrides of such acids, and esters thereof, where they exist.

Drying oils may include, but are not limited to, coconut oil, fish oil, linseed oil, tung oil, castor oil, cottonseed oil, safflower oil, sunflower oil, soybean oil, and tall oil.

In addition to an amount of polyol reacted with a fatty acid, fatty ester, or naturally occurring-partially saponified oil, an additional amount of a polyol or other branching agent such as a polycarboxylic acid may be used to increase the molecular weight and branching of the alkyd resin, and may be selected from the group consisting of trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

Alkyds may be produced, for example, by direct fusion of glycerol, phthalic anhydride and drying oil. Solvents may be added to reduce the viscosity. Various proportions of the polycarboxylic acid, polyhydric alcohol, and oil are used to obtain alkyd resins of various properties, as is well known in the art.

Silicones are polysiloxane polymers with backbones consisting of [—Si(R)$_2$—O—] repeat units where the R group can be any organic moiety such as methyl, or phenyl, or polyether. Silicones can be linear such as silicone fluids, branched such as silicone resins or crosslinked such as silicone rubbers. Silicones are typically characterized by their low $T_g$ because of the ease of rotation around the Si—O—Si bond.

The polyolefin may comprise at least one or more base polymers. The base polymer may, for example, be a polymer selected from the group consisting of ethylene-based polymers, and propylene-based polymers.

In selected embodiments, the base polymer is formed from ethylene-alpha olefin copolymers or propylene-alpha olefin copolymers. In particular, in preferred embodiments, the base polymer comprises one or more non-polar polyolefins.

In other selected embodiments, olefin block copolymers, for example, ethylene multi-block copolymer, such as those described in the International Publication No. WO2005/090427 and U.S. patent application Ser. No. 11/376,835 may be used as the base polymer. Such olefin block copolymer may be an ethylene/α-olefin interpolymer:

(a) having a $M_w/M_n$ from 1.7 to 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from 1.7 to 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° C. \text{ for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of 1:1 to 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In alternative embodiments, polyolefins such as polypropylene, polyethylene, and copolymers thereof, and blends thereof, as well as ethylene-propylene-diene terpolymers, may be used as the base polymer. In some embodiments, exemplary olefinic polymers include, but are not limited to, homogeneous polymers described in U.S. Pat. No. 3,645,992 issued to Elston; high density polyethylene (HDPE) as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

Polymer compositions described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, may be also be used as the base polymer. Of course, blends of polymers can be used as well. In some embodiments, the blends of base polymers include two different Ziegler-Natta polymers. In other embodiments, the blends of base polymers can include blends of a Ziegler-Natta and a metallocene polymer. In still other embodiments, the base polymer blend may be a blend of two different metallocene polymers. In other embodiments polymers produced from single site catalysts may be used. In yet another embodiment, block or multi-block copolymers may be used. Such polymers include those described and claimed in WO2005/090427 (having priority to U.S. Ser. No. 60/553,906, filed Mar. 7, 2004).

In some particular embodiments, the base polymer is a propylene-based copolymer or interpolymer. In some embodiments, the propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra.

In other particular embodiments, the base polymer may be ethylene vinyl acetate (EVA) based polymers. In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In certain embodiments, the base polymer can be an ethylene-octene copolymer or interpolymer having a density between 0.863 and 0.911 g/cc and melt index (190° C. with 2.16 kg weight) from 0.1 to 1200 g/10 min, or in the alternative, from 0.1 to 1000 g/10 min, and in another alternative, 0.1 to 100 g/10 min. In other embodiments, the ethylene-octene copolymers may have a density between 0.863 and 0.902 g/cm³ and melt index (measured at 190° C. under a load of 2.16 kg) from 0.8 to 35 g/10 min.

In certain embodiments, the base polymer can be a propylene-ethylene copolymer or interpolymer having an ethylene content between 5 and 20 percent by weight and a melt flow rate (measured at 230° C. under a load of 2.16 kg) from 0.5 to 300 g/10 min. In other embodiments, the propylene-ethylene copolymer or interpolymer may have an ethylene content between 9 and 12 percent by weight and a melt flow rate (measured at 230° C. under a load of 2.16 kg) from 1 to 100 g/10 min.

In certain other embodiments, the base polymer can be a low density polyethylene having a density between 0.911 and 0.925 g/cm$^3$ and melt index (measured at 190° C. under a load of 2.16 kg) from 0.1 to 100 g/10 min.

In other embodiments, the base polymer can have a crystallinity of less than 50 percent. For example, the crystallinity of the base polymer may be from 5 to 35 percent; or in the alternative, the crystallinity can range from 7 to 20 percent.

In certain other embodiments, the base polymer can have a melting point of less than 110° C. For example, the melting point may be from 25 to 100° C.; or in the alternative, the melting point may be between 40 and 85° C.

In certain embodiments, the base polymer can have a weight average molecular weight greater than 20,000 g/mole. For example, the weight average molecular weight may be from 20,000 to 150,000 g/mole; or in the alternative, from 50,000 to 100,000 g/mole.

The one or more base polymers, for example, thermoplastic resins, may be contained within the aqueous dispersion in an amount from 1 percent by weight to 96 percent by weight. For instance, the one or more base polymers, for example, thermoplastic resins, may be present in the aqueous dispersion in an amount from 10 percent by weight to 70 percent by weight, such as from 20 percent to 50 percent by weight.

Polyurethane component comprises a polyurethane prepolymer, which is optionally chain extended via a chain extender. The polyurethane prepolymer contains substantially no organic solvent and also has at least two isocyanate groups per one molecule. Such a urethane prepolymer, as used herein, further refers to a polyurethane prepolymer wherein the content of the organic solvent in the polyurethane prepolymer is 10 percent by weight or less based on the total weight of the first polyurethane prepolymer. To eliminate the step of removing the organic solvent, the content of the organic solvent may, for example, be 5 percent by weight or less based on the total weight of the first polyurethane prepolymer; or in the alternative, the content of the organic solvent may be 1 percent by weight or less based on the total weight of the first polyurethane prepolymer; or in another alternative, the content of the organic solvent may be 0.1 percent by weight or less based on the total weight of the polyurethane prepolymer.

The number average molecular weight of the polyurethane prepolymer used in the present invention may, for example, be within the range from 1,000 to 200,000. All individual values and subranges from 1,000 to 200,000 are included herein and disclosed herein; for example, the polyurethane prepolymer may have a number average molecular weight in the range of 2,000 to about 20,000. The polyurethane prepolymer may further include small amounts of monomeric isocyanates.

The polyurethane prepolymer used in the present invention may be produced by any conventionally known processes, for example, solution process, hot melt process, or prepolymer mixing process. Furthermore, the polyurethane prepolymer may, for example, be produced via a process for reacting a polyisocyanate compound with an active hydrogen-containing compound and examples thereof include 1) a process for reacting a polyisocyanate compound with a polyol compound without using an organic solvent, and 2) a process for reacting a polyisocyanate compound with a polyol compound in an organic solvent, followed by removal of the solvent.

For example, the polyisocyanate compound may be reacted with the active hydrogen-containing compound at a temperature in the range of 20° C. to 120° C.; or in the alternative, in the range of 30° C. to 100° C., at an equivalent ratio of an isocyanate group to an active hydrogen group of, for example, from 1.1:1 to 3:1; or in the alternative, from 1.2:1 to 2:1. In the alternative, the prepolymer may be prepared with an excess amount of polyols thereby facilitating the production of hydroxyl terminal polymers.

For example, an excess isocyanate group may optionally be reacted with aminosilane, thereby converting the terminal group into a reactive group other than isocyanate group, such as an alkoxysilyl group.

The polyurethane prepolymer may further include a polymerizable acrylic, styrenic, or vinyl monomers as a diluent, which can then be polymerized by free radical polymerization via an initiator.

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3 and 1,4-bis (isocyanatemethyl)isocynate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, isomers thereof, and/or combinations thereof.

The active hydrogen-containing compound used to produce the polyurethane prepolymer used in the present invention includes, but is not limited to, for example, a compound having comparatively high molecular weight (hereinafter referred to as a first high-molecular weight compound) and a compound having comparatively low molecular weight (hereinafter referred to as a first low-molecular weight compound).

The number average molecular weight of the first high-molecular weight compound may, for example, be within a range from 300 to 20,000; or in the alternative, within a range from 500 to 5,000. The number average molecular weight of the first low-molecular weight compound may, for example, be less than 300. These active hydrogen-containing compounds may be used alone, or two or more kinds of them may be used in combination.

Among these active hydrogen-containing compounds, examples of the first high-molecular weight compound include, but are not limited to aliphatic and aromatic polyester polyols including caprolactone based polyester polyols, seed oil based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyols.

The natural oil based polyols are polyols based on or derived from renewable feedstock resources such as natural and/or genetically modified (GMO) plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. Preferably the natural product contains at least about 85 percent by weight unsaturated fatty acids. Examples of preferred vegetable oils include, for example, those from castor, soybean, olive, peanut, rapeseed, corn, sesame, cotton, canola, safflower, linseed, palm, grape seed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Additionally, oils obtained from organisms such as algae may also be used. Examples of animal products include lard, beef tallow, fish oils and mixtures thereof. A combination of vegetable and animal based oils/fats may also be used.

Several chemistries can be used to prepare the natural oil based polyols. Such modifications of a renewable resource include, for example, epoxidation, hydroxylation, ozonolysis, esterification, hydroformylation, or alkoxylation. Such modifications are commonly known in the art and are described, for example, in U.S. Pat. Nos. 4,534,907, 4,640, 801, 6,107,433, 6,121,398, 6,897,283, 6,891,053, 6,962,636, 6,979,477, and PCT publication Nos. WO 2004/020497, WO 2004/096744, and WO 2004/096882.

After the production of such polyols by modification of the natural oils, the modified products may be further alkoxylated. The use of ethylene oxide (EO) or mixtures of EO with other oxides, introduce hydrophilic moieties into the polyol. In one embodiment, the modified product undergoes alkoxylation with sufficient EO to produce a natural oil based polyol with between 10 weight percent and 60 weight percent EO; preferably between 20 weight percent and 40 weight percent EO.

In another embodiment, the natural oil based polyols are obtained by a multi-step process wherein the animal or vegetable oils/fats is subjected to transesterification and the constituent fatty acids recovered. This step is followed by hydroformylating carbon-carbon double bonds in the constituent fatty acids to form hydroxymethyl groups, and then forming a polyester or polyether/polyester by reaction of the hydroxymethylated fatty acid with an appropriate initiator compound. Such a multi-step process is commonly known in the art, and is described, for example, in PCT publication Nos. WO 2004/096882 and 2004/096883. The multi-step process results in the production of a polyol with both hydrophobic and hydrophilic moieties, which results in enhanced miscibility with both water and conventional petroleum-based polyols.

The initiator for use in the multi-step process for the production of the natural oil based polyols may be any initiator used in the production of conventional petroleum-based polyols. Preferably the initiator is selected from the group consisting of neopentylglycol; 1,2-propylene glycol; trimethylolpropane; pentaerythritol; sorbitol; sucrose; glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-cyclohexanedimethanol; 1,3-cyclohexanedimethanol; mixture of 1,3- and 1,4-cyclohexanedimethanol (UNOXOL™-diol); 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. More preferably the initiator is selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof. More preferably, the initiator is glycerol, trimethylopropane, pentaerythritol, sucrose, sorbitol, and/or mixture thereof.

In one embodiment, the initiators are alkoxylated with ethylene oxide or a mixture of ethylene oxide and at least one other alkylene oxide to give an alkoxylated initiator with a molecular weight between 200 and 6000, preferably between 500 and 3000.

The functionality of the at least one polyol, for example, a natural oil based polyol, is above about 1.5 and generally not higher than about 6. In one embodiment, the functionality of the at least one polyol, for example, a natural oil based polyol is in the range of 1.5 to 3. In one embodiment, the functionality of the at least one polyol, for example, a natural oil based polyol is in the range of 1.5 to 2.5. In one embodiment, the functionality of the at least one polyol, for example, a natural oil based polyol is about 2. In one embodiment, the functionality is below about 4. The hydroxyl number of the at least one polyol, for example, a natural oil based polyol is below about 300 mg KOH/g, preferably between 50 and 300, more preferably between 60 and 200. In one embodiment, the hydroxyl number is below about 100.

The level of renewable feedstock in the natural oil based polyol can vary between 10 and 100 percent, usually between 10 and 90 percent.

The natural oil based polyols may constitute up to about 90 weight percent of the polyol blend. However, in one embodiment, the natural oil based polyol may constitute at least 5 weight percent, at least 10 weight percent, at least 25 weight percent, at least 35 weight percent, at least 40 weight percent, at least 50 weight percent, or at least 55 weight percent of the total weight of the polyol blend. The natural oil based polyols may constitute 40 percent or more, 50 weight percent or more, 60 weight percent or more, 75 weight percent or more, 85 weight percent or more, 90 weight percent or more, or 95 weight percent or more of the total weight of the combined polyols.

Combination of two types or more of natural oil based polyols may also be used.

The viscosity measured at 25° C. of the natural oil based polyols is generally less than about 6,000 mPa·s. Preferably, the viscosity is less than about 5,000 mPa·s.

As the polyester polyol, polyester polyol, for example, obtained by the polycondensation reaction of a glycol and an acid may be used.

Examples of the glycol, which can be used to obtain the polyester polyol, include, but are not limited to, ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol, dipropylene glycol, tripropylene glycol, bishydroxyethoxybenzene, 1,4-cyclohexanediol, 1,4-cyclohexanedimethanol, 1,3-cyclohexanedimethanol, mixture of 1,3- and 1,4-cyclohexanedimethanol (UNOXOL™-diol), bisphenol A, hydrogenated bisphenol A, hydroquinone, and alkylene oxide adducts thereof.

Examples of the acid, which can be used to obtain the polyester polyol, include, but are not limited to, succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; and p-hydroxybenzoic acid, p-(2-hydroxyethoxy)benzoic acid, and ester-forming derivatives of these hydroxycarboxylic acids.

Also a polyester obtained by the ring-opening polymerization reaction of a cyclic ester compound such as ε-caprolactone, and copolyesters thereof may be used.

The polyester polyols may also be produced by transesterification of the above-mentioned diols and triols with hydroxy group containing fatty acid methyl esters.

Examples of the polyether polyol include, but are not limited to, compounds obtained by the polyaddition reaction of one or more kinds of compounds having at least two active hydrogen atoms such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, ethylenediamine, diethylenetriamine, triisopropanolamine, pyrogallol, dihydroxybenzoic acid, hydroxyphthalic acid, and 1,2,3-propanetrithiol with one or more kinds among ethylene oxide, propylene oxide, butylene oxide, styrene oxide, epichlorohydrin, and tetrahydrofuran.

Examples of the polycarbonate polyol include, but are not limited to, compounds obtained by the reaction of glycols such as 1,4-butanediol, 1,6-hexanediol, and diethylene glycol, with diphenyl carbonate and phosgene.

Among the active hydrogen-containing compounds, the first low-molecular weight compound is a compound which has at least two active hydrogens per one molecule and has a number average molecular weight of less than 300, and examples thereof include, but are not limited to, glycol components used as raw materials of the polyester polyol; polyhydroxy compounds such as glycerin, trimethylolethane, trimethylolpropane, sorbitol, and pentaerythritol; and amine compounds such as ethylenediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, 1,2-propanediamine, hydazine, diethylenetriamine, and triethylenetetramine.

The polyurethane prepolymer may further include a hydrophilic group. The term "hydrophilic group," as used herein, refers to an anionic group (for example, carboxyl group, sulfonic acid group, or phosphoric acid group), or a cationic group (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide).

Among hydrophilic groups, a nonionic hydrophilic group having a repeating unit of ethylene oxide may, for example, be preferred because the finally obtained polyurethane emulsion has excellent compatibility with other kinds of emulsions. Introduction of a carboxyl group and/or a sulfonic acid group is effective to make the particle size finer.

The ionic group refers to a functional group capable of serving as a hydrophilic ionic group which contributes to self dispersibility in water by neutralization, providing colloidal stability during the processing against agglomeration; stability during shipping, storage and formulation with other additives. These hydrophilic groups could also introduce application specific properties such as adhesion.

When the ionic group is an anionic group, the neutralizer used for neutralization includes, for example, nonvolatile bases such as sodium hydroxide and potassium hydroxide; and volatile bases such as tertiary amines (for example trimethylamine, triethylamine, dimethylethanolamine, methyldiethanolamine, and triethanolamine) and ammonia can be used.

When the ionic group is a cationic group, usable neutralizer includes, for example, inorganic acids such as hydrochloric acid, sulfuric acid, and nitric acid; and organic acids such as formic acid and acetic acid.

Neutralization may be conducted before, during or after the polymerization of the compound having an ionic group. Alternatively, neutralization may be conducted during or after the polyurethane polymerization reaction.

To introduce a hydrophilic group in the polyurethane prepolymer, a compound, which has at least one active hydrogen atom per one molecule and also has the above hydrophilic group, may be used as an active hydrogen-containing compound. Examples of the compound, which has at least one active hydrogen atom per one molecule and also has the above hydrophilic group, include:

(1) sulfonic acid group-containing compounds such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid, and 2,4-diaminotoluene-5-sulfonic acid, and derivatives thereof, or polyester polyols obtained by copolymerizing them;

(2) carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, and derivatives thereof, or polyester polyols obtained by copolymerizing them; tertiary amino group-containing compounds such as methyldiethanolamine, butyldiethanolamine, and alkyldiisopropanolamine, and derivatives thereof, or polyester polyol or polyether polyol obtained by copolymerizing them;

(3) reaction products of the above tertiary amino group-containing compounds, or derivatives thereof, or polyester polyols or polyether polyols obtained by copolymerizing them, with quaternizing agents such as methyl chloride, methyl bromide, dimethylsulfuric acid, diethylsulfuric acid, benzyl chloride, benzyl bromide, ethylenechlorohydrin, ethylenebromohydrin, epichlorohydrin, and bromobutane;

(4) nonionic group-containing compounds such as polyoxyethylene glycol or polyoxyethylene-polyoxypropylene copolymer glycol, which has at least 30 percent by weight of a repeating unit of ethylene oxide and at least one active hydrogen in the polymer and also has a molecular weight of 300 to 20,000, polyoxyethylene-polyoxybutylene copolymer glycol, polyoxyethylene-polyoxyalkylene copolymer glycol, and monoalkyl ether thereof, or polyester-polyether polyols obtained by copolymerizing them; and (5) combinations thereof.

Epoxy resin refers to a composition which possesses one or more vicinal epoxy groups per molecule, that is, at least one 1,2-epoxy group per molecule. In general, such compound is a saturated or unsaturated aliphatic, cycloaliphatic, aromatic or heterocyclic compound which possesses at least one 1,2-epoxy group. Such compound can be substituted, if desired, with one or more non-interfering substituents, such as halogen atoms, hydroxy groups, ether radicals, lower alkyls and the like.

Illustrative epoxies are described in the *Handbook of Epoxy Resins* by H. E. Lee and K. Neville published in 1967 by McGraw-Hill, New York and U.S. Pat. No. 4,066,628, incorporated herein by reference.

Particularly useful compounds which can be used in the practice of the present invention are epoxy resins having the following formula:

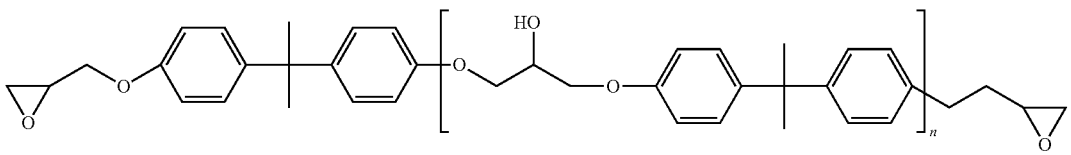

wherein n has an average value of 0 or more.

The epoxy resins useful in the present invention may include, for example, the glycidyl polyethers of polyhydric phenols and polyhydric alcohols. As an illustration of the present invention, examples of known epoxy resins that may be used in the present invention, include for example, the diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyltetrabromobiphenol, tetramethyltribromobiphenol, tetrachlorobisphenol A and any combination thereof.

Examples of diepoxides particularly useful in the present invention include diglycidyl ether of 2,2-bis(4-hydroxyphenyl)propane (generally referred to as bisphenol A) and diglycidyl ether of 2,2-bis(3,5-dibromo-4-hydroxyphenyl)propane (generally referred to as tetrabromobisphenol A). Mixtures of any two or more polyepoxides can also be used in the practice of the present invention.

Other diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other suitable diepoxides include for example, αω-diglycidyloxyisopropylidene-bisphenol-based epoxy resins (commercially known as D.E.R.® 300 and 600 series epoxy resins, products of The Dow Chemical Company, Midland, Mich.).

The epoxy resins which can be employed in the practice of the present invention also include epoxy resins prepared either by reaction of diglycidyl ethers of dihydric phenols with dihydric phenols or by reaction of dihydric phenols with epichlorohydrin (also known as "taffy resins").

Exemplary epoxy resins include, for example, the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

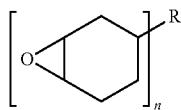

wherein R is a hydrocarbon group optionally comprising one or more heteroatoms (such as, without limitation thereto Cl, Br, and S), or an atom or group of atoms forming a stable bond with carbon (such as, without limitation thereto, Si, P and B) and wherein n is greater than or equal to 1.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cyclohexane carboxylate, bis-(3,4-epoxycyclohexyl)adipate, vinylcyclohexene monoxide and mixtures thereof.

The emulsion polymer may be selected from the group consisting of styrene/acrylic, acrylic, vinyl acrylic, vinyl acetate/ethylene, styrene/butadiene.

Examples of suitable (meth)acrylates include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

Suitable non-ester monomers that are sometimes classified with the (meth)acrylates are the nitriles. A preferred nitrile monomer is acrylonitrile.

Other monomers that are useful in these copolymers of the instant invention include vinyl aromatic monomers, aliphatic conjugated diene monomers, monoethylenically unsaturated carboxylic acid monomers, vinyl acetate monomer, vinylidene halide monomer and vinyl halide monomer. In some other desirable copolymers suitable for use in this invention, the monomers of the polymerization mixture include from 1 to 40 weight percent of one or more (meth) acrylate monomers.

As used herein, "vinyl aromatic monomers" refer to any organic compound containing at least one aromatic ring and at least one aliphatic-containing moiety having vinyl unsaturation; provided. Illustrative vinyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. The preferred vinyl aromatic monomers are styrene and vinyltoluene; and due to its commercial availability and low cost, styrene is the more preferred vinyl aromatic monomer.

The term "conjugated diene monomer", as used herein, is meant to include compounds such as 1,3-butadiene, isoprene, 1,3-pentadiene, 2-ethyl-1,3-butadiene, and 4-methyl-1,3-pentadiene, 2-methyl-1,3-butadiene, piperylene (1,3-pentadiene), and other hydrocarbon analogs of 1,3-butadiene. The preferred alkadiene monomer is 1,3-butadiene. Other monomers inclusive as aliphatic conjugated dienes are halogenated compounds, such as, for example, 2-chloro-1,3-butadiene.

The monomers of the vinyl group, such as, for example, "vinylidene halides" and "vinyl halides," are suitable for inclusion in the copolymer of this invention, and include, for example, vinylidene chloride and vinyl chloride, which are highly preferred. Vinylidene bromides and vinyl bromide can also be employed. Another vinyl monomer within the vinyl group is vinyl acetate.

Suitable alpha, beta-ethylenically unsaturated aliphatic carboxylic acid monomers are monoethylenically unsaturated monocarboxylic, dicarboxylic and tricarboxylic acids having the ethylenic unsaturation alpha-beta to at least one of the carboxyl groups and similar monomers having a higher number of carboxyl groups. It is understood that the carboxyl groups may be present in the acid or salt form (—COOM in which M represents a cation such as ammonium, hydrogen or a metal such as, for example, sodium or potassium) and are readily interconvertible by well known simple procedures.

Specific examples of the alpha, beta-ethylenically unsaturated aliphatic carboxylic acids are acrylic acid, methacrylic acid, fumaric acid, itaconic acid, maleic acid, aconitic acid, various alpha-substituted acrylic acids such as alpha-ethacrylic acid, alpha-propyl acrylic acid and alpha-butyl acrylic acid. Highly preferred acid monomers are acrylic acid and methacrylic acid.

In alternative embodiments, the content of alpha, beta-ethylenically unsaturated aliphatic carboxylic acid monomers in the copolymer is desirably in the range from 0 to 4 weight percent, more preferably from 0.2 to 3 weight percent, still more preferably from 0.3 to 2 weight percent.

Within the scope of this invention are other embodiments wherein the copolymer utilized would not be classified as a (meth)acrylate copolymer. Other copolymer types that can be utilized include, for example, combinations of vinyl aromatic monomers with (meth)acrylate monomers, such as, for example, the styrene acrylates, and of vinyl aromatic monomers with conjugated diene monomers, such as, for example, styrene butadiene copolymers. These copolymers may be non-carboxylated or carboxylated.

The copolymer desirably is made, for example, by charging the monomeric ingredients, water, and a surfactant (when employed) into a reaction vessel, purging the reaction vessel with an inert gas, such as, for example, nitrogen, to remove essentially all the oxygen from the reactor vessel, and heating the reactor vessel to the reaction temperature, usually from 80° to 100° C. When the reactor vessel reaches the desired reaction temperature, an initiator is then added to the reaction vessel, and the reaction is continued for 2 to 4 hours. After the reaction is completed, the reactor vessel is cooled. This synthesis yields an aqueous copolymeric composition comprising the copolymer in water. In some instances, the composition has the appearance of a milky liquid, while in other instances it looks like a clear solution.

Anionic, nonionic, and amphoteric surface active compounds, that is, surfactants, can be employed in the copolymer synthesis process. However, in some instances, no surfactant is required. Exemplary anionic, nonionic, and amphoteric surfactants are SIPONATE A246L brand surfactant available from Rhone-Poulenc, polyoxyethylene alkyl phenol surfactants, and N,N-bis-carboxyethyl lauramine, respectively. Another useful surfactant is DOWFAX 2EP, the sodium salt of dodecylated sulfonated phenyl ether, which is available from The Dow Chemical Company, Midland, Mich. 48640, U.S.A.

A polyester comprises the polycondensation reaction product of aromatic, aliphatic or cycloaliphatic polycarboxylic acid such as terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with an aliphatic or cycloaliphatic glycol one or more glycols, particularly aliphatic glycols, for example ethylene glycol, 1,3-propanediol, 1,4-butanediol, neopentyl glycol and 1,4-cyclohexanedimethanol. These materials can also contain free acid functionality, which can be neutralized with bases, preferably with ammonia or amines, but also with alkali metal hydroxides or alkaline earth metal hydroxides. The neutralization of the acid groups forms strongly polar salt groups, and the polyester can then be dispersed in water.

One or more surfactants may be included in the second internal phase or added to the seed dispersion. The surfactant may be anionic, ionic, cationic or zwitterionic or a mixture of nonionic with cationic, anionic or zwitterionic. Preferred are nonionic and anionic surfactants. Cationic surfactants such as ammonium salts can also be used.

Examples of anionic surfactants are metal or ammonia salts of sulfonates, phosphates and carboxylates. Suitable surfactants include alkali metal salts of fatty acids such as sodium stearate, sodium palmitate, potassium oleate, alkali metal salts of fatty acid sulfates such as sodium lauryl sulfate, the alkali metal salts of alkylbenzenesulfones and alkylnaphthalenesulfones such as sodium dodecylbenzenesulfonate, sodium alkylnaphthalene-sulfonate; the alkali metal salts of dialkyl-sulfosuccinates; the alkali metal salts of sulfated alkylphenol ethoxylates such as sodium octylphenoxypolyethoxyeth-yl sulfate; the alkali metal salts of polyethoxyalcohol sulfates and the alkali metal salts of polyethoxyalkylphenol sulfates. metal sulfosuccinate such as dioctyl sodium sulfosuccinate, sodium lauryl sulfate, a sulfosuccinic acid-4-ester with polyethylene glycol dodecylether disodium salt, an alkyl disulfonated diphenyloxide disodium salt such as mono- and dialkyl disulfonated diphenyloxide, disodium salt, dihexyl sodium sulfosuccinate, polyoxy-1,2-ethandiyl-.alpha.-tridecyl-.omega.-hydroxyphosphate, and alkylethersulfate sodium salt Examples of nonionic surfactants include polyethylene glycol fatty acid mono- and diesters (such as PEG-8 laurate, PEG-10 oleate, PEG-8 dioleate, and PEG-12 distearate); polyethylene glycol glycerol fatty acid esters (such as PEG-40 glyceryl laurate and PEG-20 glyceryl stearate); alcohol-oil transesterification products (such as PEG-35 castor oil, PEG-25 trioleate, and PEG-60 corn glycerides); polyglycerized fatty acids (such as polyglyceryl-2-oleate and polyglyceryl-10 trioleate); propylene glycol fatty acid esters (such as propylene glycol monolaurate); mono- and diglycerides (such as glyceryl monooleate and glyceryl laurate); sterol and sterol derivatives (such as cholesterol); sorbitan fatty acid esters and polyethylene glycol sorbitan fatty acid esters (such as sorbitan monolaurate and PEG-20 sorbitan monolaurate); polyethylene glycol alkyl ethers (such as PEG-3 oleyl ether and PEG-20 stearyl ether); sugar esters (such as sucrose monopalmitate and sucrose monolaurate); polyethylene glycol alkyl phenols (such as PEG-10-100 nonyl phenol, and PEG-15-100 octyl phenol ether); polyoxyethylene-polyoxypropylene block copolymers (such as poloxamer 108 and poloxamer 182); lower alcohol fatty acid esters (such as ethyl oleatea and isopropyl myristate); ethylene oxide adducts of phenols, such as nonyl phenol and any combinations thereof.

Further, if the hydrophobic phase is self-emulsifying by inclusion of emulsifying nonionic, cationic, or anionic groups, then an external surfactant may or may not be necessary.

Additional examples of nonionic surfactants include polyethylene glycol fatty acid mono- and diesters (such as PEG-8 laurate, PEG-10 oleate, PEG-8 dioleate, and PEG-12 distearate); polyethylene glycol glycerol fatty acid esters (such as PEG-40 glyceryl laurate and PEG-20 glyceryl stearate); alcohol-oil transesterification products (such as PEG-35 castor oil, PEG-25 trioleate, and PEG-60 corn glycerides); polyglycerized fatty acids (such as polyglyceryl-2-oleate and polyglyceryl-10 trioleate); propylene glycol fatty acid esters (such as propylene glycol monolaurate); mono- and diglycerides (such as glyceryl monooleate and glyceryl laurate); sterol and sterol derivatives (such as cholesterol); sorbitan fatty acid esters and polyethylene glycol sorbitan fatty acid esters (such as sorbitan monolaurate and PEG-20 sorbitan monolaurate); polyethylene glycol alkyl ethers (such as PEG-3 oleyl ether and PEG-20 stearyl ether); sugar esters (such as sucrose monopalmitate and sucrose monolaurate); polyethylene glycol alkyl phenols (such as PEG-10-100 nonyl phenol, and PEG-15-100 octyl phenol ether); polyoxyethylene-polyoxypropylene block copolymers (such as poloxamer 108 and poloxamer 182); lower alcohol fatty acid esters (such as ethyl oleatea and isopropyl myristate); and any combinations thereof.

Additional examples of suitable ionic surfactants include fatty acid salts (such as sodium laurate and sodium lauryl scarcosinate); bile salts (such as sodium cholate and sodium taurocholate); phosphoric acid esters (such as diethanolammonium polyoxyethylene-10 oleyl ether phosphate); carboxylates (such as ether carbokylates and citric acid esters of mono and diglycerides); acyl lactylates (such as lactylic esters of fatty acids, and propylene glycol aginate); sulfates and sulfonates (such as ethoxylated alkyl sulfates, alkyl benzene sulfones, and acyl taurates); alkyl, aryl, and alkyl-aryl sulfonates and phosphates; and any combinations thereof.

In certain embodiments, the surfactant, that is, the stabilizing agent, can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids or fatty acid salts having from 12 to 60 carbon atoms. In other embodiments, the long chain fatty acid or fatty acid salt may have from 12 to 40 carbon atoms.

If the polar group of the polymer is acidic or basic in nature, the polymeric stabilizing agent may be partially or fully neutralized with a neutralizing agent to form the corresponding salt. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be any amine such as monoethanolamine, or 2-amino-2-methyl-1-propanol (AMP). Those having ordinary skill in the art will appreciate that the selection of an appropriate neutralizing agent depends on the specific composition formulated, and that such a choice is within the knowledge of those of ordinary skill in the art.

In production, a first stream comprising a continuous aqueous phase comprising the seed dispersions is flowed through a first conduit and merged continuously with a second stream of a the second hydrophobic phase that is flowed through a second conduit. The first and second streams are merged into a disperser in the presence of a stabilizing amount of surfactant. The surfactant can be added to either the first or second stream, or as a separate third stream, but is preferably added to the stream containing the second hydrophobic phase. Optionally, a third stream comprising water can be merged with the first two streams and surfactant in the disperser. The flow rates of the streams are adjusted to achieve a composite dispersion having the desired amount of first hydrophobic and second hydrophobic phases and percent solids. The disperser can be any one of a number of continuous mixers such as an IKA high-shear mixer, centrifugal pump, or Oakes rotor stator mixer. The rpm setting of the disperser can be used to help control the particle size of the second hydrophobic phase in the composite dispersion. In one embodiment, an extruder may be employed to facilitate the production of a polyolefin dispersion seed.

In alternative production, a first stream comprising (1) a first seed dispersion comprising (a) a first internal phase comprising a first hydrophobic material selected from the group consisting of alkyd, silicone, polyolefin, polyurethane, epoxy, emulsion polymer, and polyester; and (b) an external phase comprising water, (2) optionally surfactant, and (3) optionally water is fed into a mixer, for example an OAKS Mixer or an IKA Mixer or those mixers disclosed in the U.S. Patent Application Ser. No. 60/875,657 filed on Dec. 19, 2006, incorporated herein by reference in its entirety, while a second stream comprising (1) a second internal phase comprising a second hydrophobic material selected from the group consisting of alkyd, silicone, polyurethane prepolymer, epoxy, and polyester is fed into the mixer. First stream and second stream are merged together optionally in the presence of a chain extender, dilution water, and/or combinations thereof. The second stream is emulsified into the first stream via high shear rate mixing thereby forming the composite dispersion of the instant invention.

EXAMPLES

The following examples illustrate the present invention but are not intended to limit the scope of the invention.

Seed Dispersion 1-11

Seed dispersion 1 is a polyurethane seed comprising 51.72 percent by weight of polyurethane oil phase, 1.08 percent by weight of Rhodacal LDS-22 (sodium dodecylbenzene sulfonate), 47.19 percent by weight of water.

The polyurethane oil phase comprised 86 percent by weight of Acclaim™ 8200 (polyol), 2 percent by weight of Carbowax™ E1000 (polyethylene oxide), 1.5 percent by weight of Tegomer™ 3403 (polyether 1,3 diol), 0.25 percent by weight of Irganox™ 245 (phenolic antioxidant), 0.8 percent by weight of dipropylene glycol, 9.45 percent by weight of isophorone diisocyanate. The ingredients were mixed together, and reacted in an oven at 80° C. for 6 hours before it was cooled to room temperature, 25° C., for use as the polyurethane oil phase. Seed dispersion 1 had a $V_{mean}$ of 0.49 µm, the diameter of $90^{th}$ percentile particle size is approximately 0.82 µm, a polydispersity (Dv/Dn) of 1.38, a solid content of 52.81 percent, a viscosity of approximately 5400 cP measured by RV4 spindle at 20 rpm.

Seed dispersion 2 is an emulsion polymer seed, obtained from The Dow Chemical Company under the tradename UCAR 626. The internal phase is acrylic polymer. Seed dispersion 2 has a $V_{mean}$ of 0.13 µm, the diameter of $90^{th}$ percentile particle size is approximately 0.21 µm, a polydispersity (Dv/Dn) of 1.51, a solid content of 50 percent, and a viscosity of approximately 60 cP measured by RV4 spindle at 20 rpm.

Seed dispersion 3 is a polyolefin seed dispersion comprising 30.07 percent by weight of Versify™ 4301 (propylene-ethylene copolymer), 1.92 percent by weight of Unicid™ 350 (C24-C29 fatty acid), 68.01 percent by weight of water. Seed dispersion 3 has a $V_{mean}$ of 0.594 µm, the diameter of $90^{th}$ percentile particle size is approximately 0.984 µm, a polydispersity (Dv/Dn) of 1.45, a solid content of 31.99 percent, and a viscosity of approximately 110 cP measured by RV4 spindle at 20 rpm.

Seed dispersion 4 is an epoxy seed, obtained from The Dow Chemical Company, and the internal phase is the reaction product of Bisphenol A and epoxy resin of $M_n$ 700-1100. Seed dispersion 4 has a $V_{mean}$ of 0.441 µm, the diameter of $90^{th}$ percentile particle size is approximately 0.606 µm, a polydispersity (Dv/Dn) of 1.18, a solid content of 46.38 percent, and a viscosity of approximately 4400 cP measured by RV4 spindle at 20 rpm.

Seed dispersion 5 is a polyester seed comprising 11.3 percent by weight of Fine Tone T-RM-70 (low molecular weight biosphenol-A based polyester), 1.56 percent by weight of Rhodapex CO-436 (ammonium nonylphenol ether sulfate), 5.54 percent by weight of toluene, and 81.6 percent by weight of water. Seed dispersion 5 has a $V_{mean}$ of 0.380 µm, the diameter of $90^{th}$ percentile particle size is approximately 0.501 µm, a polydispersity (Dv/Dn) of 1.11, a solid content of 18.4 percent, and a viscosity of approximately 10 cP measured by RV4 spindle at 20 rpm.

Seed dispersion 6 is a an alkyd seed comprising 44.19 percent by weight of Deltech™ 300-70M (long oil soya based alkyd), 3.83 percent by weight of oleic acid neutralized with 2-dimethylamino ethanol, 51.98 percent by weight of water. Seed dispersion 6 has a $V_{mean}$ of 0.355 µm, the diameter of $90^{th}$ percentile particle size is approximately 0.464 µm, a polydispersity (Dv/Dn) of 1.13, a solid content of 48.02 percent, and a viscosity of approximately 950 cP measured by RV4 spindle at 20 rpm.

Seed dispersion 7 is a silicone seed comprising 51.99 percent by weight of DC5562 (bis-hydroxyethoxypropyl dimethicone), 2.00 percent by weight of Brij™ 56 (ceteth-10), 1.00 percent by weight of Brij™ 30 (laureth-4), 45.01 percent by weight of water. Seed dispersion 7 has a $V_{mean}$ of 0.381 µm, the diameter of $90^{th}$ percentile particle size is approximately 0.597 µm, a polydispersity (Dv/Dn) of 3.6, a solid content of 54.97 percent, and a viscosity of approximately 350 cP measured by RV4 spindle at 20 rpm.

Seed dispersion 8 is a silicone seed comprising 46.8 percent by weight of DC 200 350 cS (polydimethylsiloxane), 1.5 percent by weight of Brij™ 35, 1.5 percent by weight of Brij™ 30 (laureth-4), 50.2 percent by weight of water. Seed dispersion 8 has a $V_{mean}$ of 1.564 µm, the diameter of $90^{th}$ percentile particle size is approximately 2.964 µm, a polydispersity (Dv/Dn) of 12.8, a solid content of 49.8 percent, and a viscosity of approximately 300 cP measured by RV4 spindle at 20 rpm.

Seed dispersion 9 is an alkyd seed comprising 66.99 percent by weight of Deltech™ 300-70M (long oil soya based alkyd), 2.08 percent by weight of Tergitol™; 15-s-30, 30.93 percent by weight of water. Seed dispersion 9 has a $V_{mean}$ of 3.98 µm, the diameter of $90^{th}$ percentile particle size is approximately 14.41 µm, a polydispersity (Dv/Dn) of 57, a solid content of 69.07 percent, and a viscosity of approximately 125 cP measured by RV4 spindle at 20 rpm.

Seed dispersion 10 is an emulsion polymer seed obtained from The Dow Chemical Company under the tradename UCAR™ 169. The internal phase is high acrylate, and vinyl acrylic copolymer. Seed dispersion 10 has a $V_{mean}$ of 0.373 µm, the diameter of $90^{th}$ percentile particle size is approximately 0.458 µm, a polydispersity (Dv/Dn) of 1.09, a solid content of 55 percent, and a viscosity of approximately 90 cP measured by RV4 spindle at 20 rpm.

Seed dispersion 11 is a polyolefin seed comprising 49.14 percent by weight of Affinity™ GA1900 (propylene-ethylene copolymer), 1.70 percent by weight of Dowfax™ 2A1 (alkyldiphenyloxide disulfonate), 1.05 percent by weight of Poloxamer™ F108 (ethylene oxide propylene oxide block copolymer), and 48.11 percent by weight of water. Seed dispersion 11 has a $V_{mean}$ of 0.634 µm, the diameter of $90^{th}$ percentile particle size is approximately 0.920 µm, a polydispersity (Dv/Dn) of 1.36, a solid content of 51.89 percent, and a viscosity of approximately 125 cP measured by RV4 spindle at 20 rpm.

Inventive Composite Dispersions 1-5

Inventive composite dispersions (ICD) 1-5 were prepared via a 4" diameter Oakes Rotor Stator Mixer Spinning at 600 rpm. DC200 350 cS (dimethicone) base hydrophobic phase was pumped with a gear pump, and the seed dispersion was pumped via a Model 500 D Isco syringe pump. The surfactant stream comprising 50 percent by weight of Brij™ 30 (laureth-4), 50 percent by weight of Brij™ 35 (laureth-23), was pumped via a heat traced (60° C.) Model 500 D Isco syringe pump. The water was pumped via a simplex piston pump, which may be required to dilute the composite dispersion down to lower percent solids for some samples. The run conditions are reported in Table I, the formulation components are reported in Table II, and evaluated properties of the inventive composite dispersions (ICD) 1-5 are reported in Table III.

TABLE I

| Composite Dispersion No. | Seed Flow Rate (ml/min) | Silicone Flow Rate (ml/min) | Surfactant Flow Rate (ml/min) | Water Flow Rate (ml/min) |
|---|---|---|---|---|
| ICD 1 | 20 | 40 | 1.67 | 0 |
| ICD 2 | 20 | 40 | 1.67 | 13 |
| ICD 3 | 20 | 40 | 1.67 | 14 |
| ICD 4 | 20 | 40 | 1.67 | 13 |
| ICD 5 | 20 | 40 | 1.67 | 19 |

TABLE II

| Composite Dispersion No. | Seed Dispersion No. | Second Hydrophobic Phase |
| --- | --- | --- |
| ICD 1 | 2 | DC200 350 cS (dimethicone) |
| ICD 2 | 2 | DC200 350 cS (dimethicone) |
| ICD 3 | 1 | DC200 350 cS (dimethicone) |
| ICD 4 | 6 | DC200 350 cS (dimethicone) |
| ICD 5 | 6 | DC200 350 cS (dimethicone) |

TABLE III

| Sample | $V_{mean}$ | Population 1 (P1) | Population 2 (P2) | Size Ratio (P2/P1) | % solids | Viscosity (cP) | Visc. Method |
| --- | --- | --- | --- | --- | --- | --- | --- |
| ICD 1 | 4.619 | 0.2 | 5 | 25 | 83.80% | 9200 | RV4, 20 |
| ICD 2 | 3.565 | 0.25 | 5 | 20 | 69.09% | 320 | RV4, 20 |
| ICD 3 | 2.237 | 0.2 | 3 | 15 | 69.71% | 4700 | RV4, 20 |
| ICD 4 | 3.654 | 0.25 | 3.5 | 14 | 68.54% | 1640 | RV4, 20 |
| ICD 5 | 3.654 | 0.25 | 3.5 | 14 | 64.37% | 940 | RV4, 20 |

Inventive Composite Dispersions 6-10

Inventive composite dispersions (ICD) 6-10 were prepared via a 2" diameter Oakes Rotor Stator Mixer spinning at 1300 rpm. Deltech™ 440-50M (all soya alkyd, meets TTR-266D, type IV) base hydrophobic phase, was pumped via a gear pump from a heated tank through a heated line at approximately 80° C., and the seed dispersion was pumped via a Model 500 D Isco syringe pump. Oleic acid was pumped via a Model 260 D Isco syringe pump. A 25 weight percent solution of 2-dimethylamino ethanol (DMEA) was pumped via a Model 500 D Isco piston syringe to form a surfactant for the alkyd oil phase, and the deionized water was pumped with a Model 500 D Isco syringe pump, which may be required to dilute the hybrid down to lower percent solids for some samples. The run conditions are reported in Table IV, the formulation components are reported in Table V, and evaluated properties of the inventive composite dispersions (ICD) 6-10 are reported in Table VI.

TABLE IV

| Sample | Seed Flow Rate (ml/min) | Alkyd Flow Rate (ml/min) | Oleic Acid Flow Rate (ml/min) | DMEA Flow Rate (ml/min) | Water Flow Rate (ml/min) |
| --- | --- | --- | --- | --- | --- |
| ICD 6 | 20 | 15 | 0.3 | 1.4 | 0 |
| ICD 7 | 20 | 15 | 0.3 | 1.4 | 2.5 |
| ICD 8 | 20 | 15 | 0.3 | 1.4 | 2.0 |
| ICD 9 | 20 | 15 | 0.3 | 1.4 | 4.5 |
| ICD 10 | 20 | 15 | 0.3 | 1.4 | 2.0 |

TABLE V

| Composite Dispersion No. | Seed Dispersion No. | Second Hydrophobic Phase |
| --- | --- | --- |
| ICD 6 | 6 | Deltech ™ 440 |
| ICD 7 | 6 | Deltech ™ 440 |
| ICD 8 | 7 | Deltech ™ 440 |
| ICD 9 | 7 | Deltech ™ 440 |
| ICD 10 | 4 | Deltech ™ 440 |

TABLE VI

| Sample | $V_{mean}$ | Population 1 (P1) | Population 2 (P2) | Size Ratio (P2/P1) | % solids | Visc. (cP) | Visc. Method |
| --- | --- | --- | --- | --- | --- | --- | --- |
| ICD 6 | 0.521 | 0.4 | 1.5 | 3.75 | 67.84% | 9080 | RV4, 20 |
| ICD 7 | 0.767 | 0.4 | 1.8 | 4.5 | 67.77% | 8760 | RV4, 20 |
| ICD 8 | 0.916 | 0.4 | 2 | 5 | 70.06% | 5830 | RV4, 20 |
| ICD 9 | 1.277 | 0.4 | 2 | 5 | 72.88% | 6940 | RV4, 20 |
| ICD 10 | 0.582 | 0.4 | 1.8 | 4.5 | 68.56% | 2250 | RV4, 20 |

Inventive Composite Dispersions 11-13

Inventive composite dispersions (ICD) 11-13 were prepared via a 4" diameter Oakes Rotor Stator Mixer Spinning at 750 rpm. Finetone™ T-RM-70 polyester base hydrophobic phase was pumped via a Nordson Versablue 25 hot melter at 90° C. A seed dispersion was pumped via a Model 500 D Isco syringe pump, and a surfactant stream comprising a 45 percent solution of Dowfax™ 2A1 (alkyldiphenyloxide disulfonate) in water was pumped via a Model 260 D Isco syringe pump. A 25 weight percent solution of 2-dimethylamino ethanol (DMEA) and deionized water were pumped via an HPLC pump, which is required to dilute the hybrid down to lower percent solids for some samples. The run conditions are reported in Table VII, the formulation components are reported in Table VIII, and evaluated properties of the inventive composite dispersions (ICD) 11-13 are reported in Table IX.

TABLE VII

| Sample | Seed Flow Rate (ml/min) | Polyester Flow Rate (ml/min) | Surfactant Flow Rate (ml/min) | DMEA Flow Rate (ml/min) | Water Flow Rate (ml/min) |
|---|---|---|---|---|---|
| ICD 11 | 50 | 30 | 4 | 0.6 | 0 |
| ICD 12 | 50 | 30 | 4 | 0.6 | 7 |
| ICD 13 | 36 | 30 | 4 | 0.6 | 0 |

TABLE VIII

| Composite Dispersion No. | Seed Dispersion No. | Second Hydrophobic Phase |
|---|---|---|
| ICD 11 | 2 | Finetone ™ T |
| ICD 12 | 2 | Finetone ™ T |
| ICD 13 | 3 | Finetone ™ T |

TABLE IX

| Sample | $V_{mean}$ | Population 1 (P1) | Population 2 (P2) | Size Ratio (P2/P1) | % solids | Viscosity (cP) | Visc. Method |
|---|---|---|---|---|---|---|---|
| ICD 11 | 4.121 | 0.2 | 10 | 50 | 63.3% | 140 | RV4, 20 |
| ICD 12 | 2.583 | 0.2 | 4 | 20 | 62.61% | 70 | RV4, 20 |
| ICD 13 | 0.623 | 0.5 | 1 | 2 | 62.56% | 3850 | RV4, 20 |

Inventive Composite Dispersions 14-25

Inventive composite dispersions (ICD) 14-25 were prepared via a 4" diameter Oakes Rotor Stator Mixer Spinning at 800 rpm. A hydrophobic phase consisting of 99.5 percent D.E.R. 331 liquid epoxy resin and 0.5 percent Poloxamer F108 (ethylene oxide propylene oxide block copolymer) was pumped via a gear pump, and a seed dispersion was pumped via a Model 500 D Isco syringe pump. Aerosol™ OT-75 (75 percent solution of sodium dioctyl sulfosuccinate in water and ethanol) was pumped via a Model 260 D Isco syringe pump. Deionized water was pumped with an HPLC (high pressure liquid chromatography) pump, which is required to dilute the hybrid down to lower percent solids for some samples. The run conditions are reported in Table X, the formulation components are reported in Table XI, and evaluated properties of the inventive composite dispersions (ICD) 14-25 are reported in Table XII.

TABLE X

| Sample | Seed Flow Rate (ml/min) | Epoxy Flow Rate (ml/min) | Surfactant Flow Rate (ml/min) | Water Flow Rate (ml/min) |
|---|---|---|---|---|
| ICD 14 | 20 | 30 | 0 | 4 |
| ICD 15 | 20 | 30 | 0 | 0 |
| ICD 16 | 20 | 30 | 2 | 17 |
| ICD 17 | 20 | 30 | 2 | 22 |
| ICD 18 | 20 | 30 | 2 | 17 |
| ICD 19 | 25 | 30 | 0 | 6 |
| ICD 20 | 30 | 30 | 2 | 16 |
| ICD 21 | 30 | 30 | 2 | 11 |
| ICD 22 | 20 | 30 | 2 | 14.7 |
| ICD 23 | 20 | 30 | 2 | 10.1 |
| ICD 24 | 20 | 30 | 2 | 13.8 |
| ICD 25 | 20 | 30 | 2 | 9.3 |

TABLE XI

| Composite Dispersion No. | Seed Dispersion No. | Second Hydrophobic Phase |
|---|---|---|
| ICD 14 | 5 | 99.5% D.E.R. 331 liquid epoxy resin and 0.5% Poloxamer F108 |
| ICD 15 | 5 | 99.5% D.E.R. 331 liquid epoxy resin and 0.5% Poloxamer F108 |
| ICD 16 | 11 | 99.5% D.E.R. 331 liquid epoxy resin and 0.5% Poloxamer F108 |
| ICD 17 | 9 | 99.5% D.E.R. 331 liquid epoxy resin and 0.5% Poloxamer F108 |
| ICD 18 | 9 | 99.5% D.E.R. 331 liquid epoxy resin and 0.5% Poloxamer F108 |
| ICD 19 | 4 | 99.5% D.E.R. 331 liquid epoxy resin and 0.5% Poloxamer F108 |
| ICD 20 | 10 | 99.5% D.E.R. 331 liquid epoxy resin and 0.5% Poloxamer F108 |
| ICD 21 | 10 | 99.5% D.E.R. 331 liquid epoxy resin and 0.5% Poloxamer F108 |
| ICD 22 | 1 | 99.5% D.E.R. 331 liquid epoxy resin and 0.5% Poloxamer F108 |
| ICD 23 | 1 | 99.5% D.E.R. 331 liquid epoxy resin and 0.5% Poloxamer F108 |
| ICD 24 | 8 | 99.5% D.E.R. 331 liquid epoxy resin and 0.5% Poloxamer F108 |
| ICD 25 | 8 | 99.5% D.E.R. 331 liquid epoxy resin and 0.5% Poloxamer F108 |

TABLE XII

| Sample | $V_{mean}$ | Population 1 (P1) | Population 2 (P2) | Size Ratio (P2/P1) | % solids | Viscosity (cP) | Visc. Method |
|---|---|---|---|---|---|---|---|
| ICD 14 | 0.600 | 0.4 | 4 | 10 | 61.64% | 200 | RV4, 20 |
| ICD 15 | 0.347 | 0.15 | 0.6 | 4 | 67.06% | 650 | RV4, 20 |
| ICD 16 | 7.28 | 2 | 10 | 5 | 62.14% | 1750 | RV4, 20 |
| ICD 17 | 2.44 | 0.6 | 2.5 | 4.1 | 63.70% | 860 | RV4, 20 |
| ICD 18 | 8.45 | 3 | 15 | 5 | 66.43% | 1290 | RV4, 20 |
| ICD 19 | 0.687 | 0.6 | 1.8 | 3 | 66.61% | 1120 | RV4, 20 |
| ICD 20 | 2.15 | 0.4 | 3.5 | 8.75 | 65.10% | 1860 | RV4, 20 |
| ICD 21 | 1.54 | 0.4 | 3 | 7.5 | 69.72% | 8800 | RV4, 20 |
| ICD 22 | 0.484 | 0.55 | 2 | 3.6 | 64.19% | 430 | RV4, 20 |
| ICD 23 | 0.686 | 0.5 | 4 | 8 | 69.67% | 930 | RV4, 20 |
| ICD 24 | 2.75 | 3 | 20 | 6.7 | 64.62% | 1600 | RV4, 20 |
| ICD 25 | 1.69 | 2 | 5 | 2.5 | 68.91% | 140 | RV4, 20 |

Inventive Composite Dispersions 26-27

Inventive composite dispersions (ICD) 26-27 were prepared via a 2" diameter Oakes Rotor Stator Mixer spinning at 1300 rpm. The base hydrophobic phase comprising 97 percent by weight of Deltech™ 300-70M (long oil soya based alkyd), 3 percent by weight of Tergitol™ 15-s-30 (secondary alcohol ethoxylate), which was pumped via a gear pump from a heated tank through a heated line at 50° C. The seed dispersion was pumped via a Model 500 D Isco syringe pump, and the deionized water was pumped via a Model 500 D Isco syringe pump, which may be required to dilute the composite dispersion down to lower percent solid content for some samples. The run conditions are reported in Table XIII, the formulation components are reported in Table XIV, and evaluated properties of the inventive composite dispersions (ICD) 26-27 are reported in Table XV.

TABLE XIII

| Sample | Seed Flow Rate (ml/min) | Alkyd Flow Rate (ml/min) | Water Flow Rate (ml/min) |
|---|---|---|---|
| ICD 26 | 20 | 15 | 4 |
| ICD 27 | 20 | 15 | 1 |

This run used Emulsion Polymer Seed #1.

TABLE XIV

| Composite Dispersion No. | Seed Dispersion No. | Second Hydrophobic Phase |
|---|---|---|
| ICD 26 | 2 | 97% Deltech ™ 300-70M and 3% Tergitol ™ 15-s-30 |
| ICD 27 | 2 | 97% Deltech ™ 300-70M and 3% Tergitol ™ 15-s-30 |

TABLE XV

| Sample | $V_{mean}$ | Population 1 (P1) | Population 2 (P2) | Size Ratio (P2/P1) | % solids | Visc. (cP) | Visc. Method |
|---|---|---|---|---|---|---|---|
| ICD 26 | 0.479 | 0.15 | 1.5 | 10 | 63.49% | 150 | RV4, 20 |
| ICD 27 | 0.615 | 0.15 | 1.5 | 10 | 68.77% | 600 | RV4, 20 |

Test Methods

Test methods include the following:
Viscosity was measured according to the following procedure. The viscosity of the dispersions was measured with a Brookfield DVII+ viscometer with RV spindles, primarily an RV4 spindle at 20 rpm. For higher viscosity samples smaller spindles (RV7 for example) or lower rpm set points were used.

The particle size distribution was measured via a Coulter LS 230 Laser Light Scattering Particle Sizer, available from Coulter Corp. The Size Ratio of the bimodal distribution is defined to be the particle diameter at the maximum of the larger diameter particle population (P2) divided by the particle diameter at the maximum of the smaller diameter particle population (P1).

The present invention may be embodied in other forms without departing from the spirit and the essential attributes thereof, and, accordingly, reference should be made to the appended claims, rather than to the foregoing specification, as indicating the scope of the invention.

We claim:

1. A composite dispersion comprising:
   a first seed dispersion comprising;
   (a) a first internal phase comprising a first hydrophobic material; and
   (b) an external phase comprising water; and
   a second internal phase comprising a second hydrophobic material;
   wherein said composite dispersion comprises more than 60 percent by the combined weight of the first internal phase and the second internal phase, and said composite dispersion has a viscosity of less than 10,000 cP measured by RV4 spindle at 20 rpm at greater than 60 weight percent total internal phase, and wherein said composite dispersion has a bimodal particle size distribution and a particle size ratio (P2/P1) in the range of 2 to 200, wherein the particle size ratio (P2/P1) of the bimodal distribution is defined to be the particle diameter at the maximum of the larger diameter particle population (P2) divided by the particle diameter at the maximum of the smaller diameter particle population (P1), wherein one or both of said first hydrophobic material and said second hydrophobic material comprises same or different alkyd, at least one of said alkyds comprising the reaction product of one or more polyhydroxyl alcohol and one or more polycarboxylic acids in the presence of drying oil.

2. The composite dispersion according to claim 1, wherein said polyhydroxyl alcohol is glycol selected from the group consisting of ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, glycerol, trimellitic anhydride, pyromellitic dianhydride, dimethylolpropionic acid, and the like.

3. The composite dispersion according to claim 1, wherein said polycarboxylic acid is selected from the group consisting of phthalic acid, maleic acid, fumaric acid, isophthalic acid, succinic acid, adipic acid, azeleic acid, sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, anhydrides thereof, and esters thereof.

4. The composite dispersion according to claim 1, wherein said drying oil is selected from the group consisting of coconut oil, fish oil, linseed oil, tung oil, castor oil, cottonseed oil, safflower oil, sunflower oil, soybean oil, and tall oil.

5. A composite dispersion comprising:
  a first seed dispersion comprising;
    (a) a first internal phase comprising a first hydrophobic material; and
    (b) an external phase comprising water; and
  a second internal phase comprising a second hydrophobic material;
  wherein said composite dispersion comprises more than 60 percent by the combined weight of the first internal phase and the second internal phase, and said composite dispersion has a viscosity of less than 10,000 cP measured by RV4 spindle at 20 rpm at greater than 60 weight percent total internal phase, and wherein said composite dispersion has a bimodal particle size distribution and a particle size ratio (P2/P1) in the range of 2 to 200, wherein the particle size ratio (P2/P1) of the bimodal distribution is defined to be the particle diameter at the maximum of the larger diameter particle population (P2) divided by the particle diameter at the maximum of the smaller diameter particle population (P1), wherein one or both of said first hydrophobic material and said second hydrophobic material comprises same or different silicone, at least one of said silicones is polysiloxane polymer.

6. The composite dispersion according to claim 5, wherein said polysiloxane polymer has a backbone comprising one or more [—Si(R)2-O—] repeat units where the R group is an organic moiety selected from the group consisting of methyl, phenyl, polyether, and alkyl.

7. The composite dispersion according to claim 5, wherein said polysiloxane polymer is linear, branched, or crosslinked.

8. The composite dispersion according to claims 1 or 7, wherein said composition is a reactive coating, peelable coating, release coating, anti-fouling coating, fabric coating, paper coating, metal coating, wood coating, barrier coating, fast drying coating, concrete coating, plastic coating, adhesive, sealant, viscosity modification agent, binder, lubricant, and the like.

* * * * *